May 23, 1961  J. G. MACDONALD  2,985,188
FREE PISTON ENGINE COMPRESSOR VALVE
Filed Oct. 18, 1957
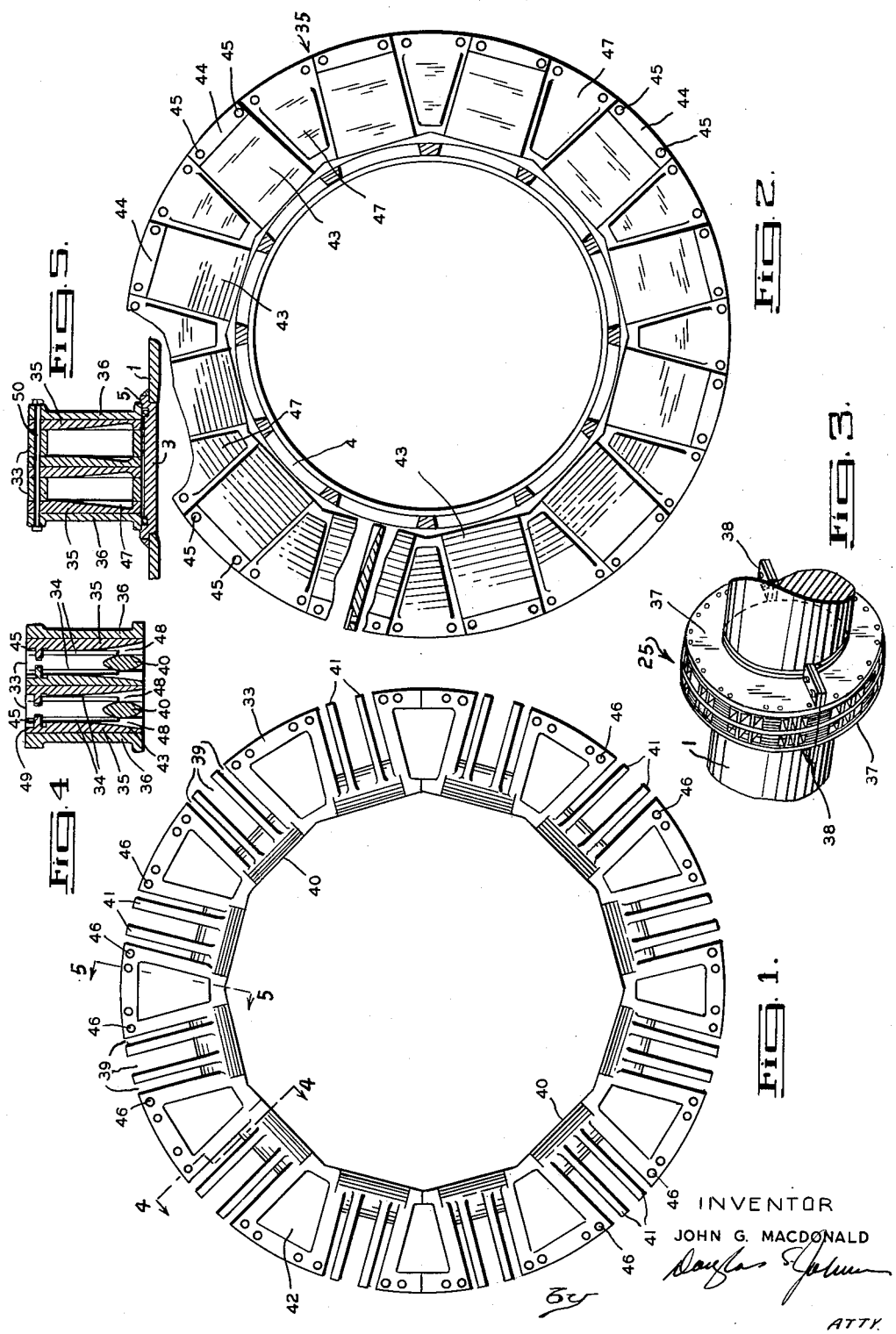
INVENTOR
JOHN G. MACDONALD
ATTY.

United States Patent Office 2,985,188
Patented May 23, 1961

2,985,188
FREE PISTON ENGINE COMPRESSOR VALVE

John G. MacDonald, Box 476, Bayfield Road, Goderich, Ontario, Canada

Filed Oct. 18, 1957, Ser. No. 690,935

5 Claims. (Cl. 137—454.4)

This invention relates to improvements in compressor valves for use with free piston engines or gasifiers.

The object of the invention is to provide an improved and simplified intake valving arrangement which will ensure adequate air intake into the compressor chamber of a free piston engine on the outward stroke of the piston under all operating conditions. Further it is an object to provide such a simplified valving arrangement which will be adapted for convenient mounting on and removal from the compressor cylinder of the engine.

In particular it is an important object to provide such an intake valving arrangement which not only will be of simple construction in itself, but will enable a compressor cylinder of simple construction to be employed and will provide for very simple servicing.

The principal feature of the invention resides in the provision of a novel intake reed valve ring formation for mounting on the compressor cylinder of a free piston engine, and forming the compressor cylinder with an annular valve seat and port means registering with the liner slots, the annular valve seat and valve ring forming a convenient means of providing adequate air intake with a simple valving arrangement without complicating the compressor cylinder construction.

These and other objects and features will become apparent from the following detailed description taken in conjunction with the accompanying drawings, in which:

Figure 1 is a side-elevational view of the reed ring of an intake valve assembly embodying the invention;

Figure 2 is a partly broken away side-elevational view of one of the follower rings of the intake valve assembly and showing its relation to the compressor cylinder seating ring;

Figure 3 is a fragmented perspective view showing the intake valve assembly of which the rings of Figure 1 and Figure 2 are components;

Figure 4 is a transverse sectional view taken through the intake assembly of Figure 3 to cut the reed rings along the line 4—4 of Figure 1;

Figure 5 is a view similar to Figure 4, but taken at a point to cut the reed rings along the line 5—5 of Figure 1.

With reference to Figures 1 to 5, it will be seen that according to the invention the valve assembly 25 which is adapted to be mounted on a sealing ring 3 having central ports 4 provided on the casing 1 of a free piston engine or the like comprises a pair of reed rings 33 arranged in parallel with which cooperate reeds 34, clamped to the reed rings by follower rings 35, the whole being clamped between clamp rings 36 which are adapted to seat within the flanges 5 of the seating ring 3 of the casing 1.

The reed rings 33, follower rings 35 and clamp rings 36 are formed as split rings in two sections so that the intake valve assembly 25 may comprise two separable sections designated at 37 in Figure 3, which sections are adapted to be clamped together as at 38 so that the intake valve assembly may be assembled on and removed from the casing 1 with convenience.

As shown in Figure 1, each of the reed rings 33 has a series of rectangular notches 39 therein which extend inwardly from the outer periphery of the ring, and terminate in a base portion 40, which as shown in Figure 4, is of elliptical or oval shape in cross-section. Extending upwardly from the base 40 of each notch are webs 41 which have a width perpendicular to the plane of the ring substantially equal to the maximum width of the base 40.

Between the notches or recesses 39, the ring 33 is hollowed out as at 42 to afford a saving of material and weight.

As shown in Figure 2, each of the follower rings 35 is provided at spacing corresponding to the spacing of the notches 39 of the reed ring with wide rectangular grooves 43 which commence adjacent to the outer periphery of the ring, as indicated at 44, and gradually increase in depth towards the inner periphery of the ring, as illustrated in Figure 4. The portion of the follower ring 35 above or radially outwardly of each of the grooves 43 above the point 44, is recessed and is provided with projecting dowels 45 which are adapted to project through the reeds 34 and into dowel openings 46 in the reed ring to clamp the reeds in position as shown in Figure 4.

Between the grooved portions 43, the follower ring is recessed as at 47 to reduce weight, the recess being particularly illustrated in Figure 5. In assembled relation, it will be seen that the follower rings 35 on each side of each reed ring 33 define a venturi passage 48 and the reeds 34, which are clamped between the reed and follower rings, extend from the outer periphery of the rings inwardly across the venturi passage to engage the base 40 of the reed ring notch 39, thus closing the venturi passage 48 at its narrowest or throat portion. Each of the reeds 34 is formed as a flat member of spring steel or other suitable resilient material, and is shown as having its outer end 49 folded to fit into the recess 47 of the respective follower ring.

It will be understood that the reed shape will correspond to the rectangular shape of the reed ring notch 39 and the follower ring groove 43 with which it cooperates and the reed will normally close the venturi passage 48 defined by the base 40 of such notch 39 and follower ring groove 43. While the dowels 45 anchor the reeds in position as shown in Figure 4, the whole intake valve assembly is clamped together by means of suitable clamping bolts 50, which pass through the assembly at points between the reeds.

With the intake reed valve assembly 25 in position on the casing 1, a vacuum, such as created by the outward stroke of a compressor piston, operating in the casing which may serve as a compressor cylinder, will produce a pressure unbalance on the reeds 34 of the assembly causing these reeds to flare away, under atmospheric pressure, from the sides of the oval bases 40 of the reed ring notches 39, allowing air under atmospheric pressure to enter into the casing 1 through the ports 4 (Figure 2). Due to the fact that the reeds 34 extend into the throat or narrowest portion of the venturi passages 48, the action of the air flow through the venturi passages creates a pressure drop in the throats of the passages due to increased velocity, which pressure drop facilitates in holding the reeds fully open. As the air leaves the venturi passages 48, its velocity is lowered and its pressure is restored to approximately the inlet pressure.

When an increase of air pressure occurs in the casing 1, e.g., under the return stroke of a compressor piston such pressure air will act to close the reeds 34 to prevent the outflow of air from the compressor chamber. In this connection, it will be understood that the webs 41 assist in supporting the reeds against deformation in the closed position of Figure 4 under such increased casing or compressor pressure.

It will be appreciated that while the reed valve assembly 25 is shown as comprising two reed rings 34 and associated follower rings 35 in parallel, any number of such assemblies may be employed as found required for the particular engine size and compressor cylinder capacity. By forming the valve assembly 25 as a ringed formation as above described, it will be appreciated that it can be conveniently mounted on and removed from the casing 1 and located so that the venturi passages 48 register with the ports 4 of the seating ring 3 of the casing 1. Also, by so constructing the valve assembly, a simple assembly of a minimum of parts which can be accurately registered is provided.

It will be understood that various modifications and alterations in the details of the valve structure may be made without departing from the spirit of the invention or scope of the appended claims.

What I claim as my invention is:

1. A valve structure for a cylinder having ports through the wall thereof comprising at least one reed ring adapted to completely encircle the cylinder and encompass the ported portion thereof, said reed ring having a plurality of generally rectangular notches therein, each of which extends inwardly from the outer periphery of the ring and terminates in a base portion of generally elliptical cross-section, at least one web extending radially outwardly from each of said base portions and having a width perpendicular to the plane of the ring substantially equal to the maximum width of the base portion from which it extends, and having its edges substantially flush with the sides of said base portion at the latter's maximum width, a follower ring clamped on each side of said reed ring, each of said follower rings having a plurality of substantially rectangular grooves in the face thereof opposing said reed ring, said grooves corresponding to and registering with said reed ring notches, said follower ring grooves gradually increasing in depth radially inwardly from the periphery of the follower rings in the vicinity of said reed ring base portions, and a plurality of reeds mounted in said grooves and clamped between said follower rings and said reed ring and in valve closing relation bearing against the base portions of said notches at their widest point and additionally bearing against and being supported by said webs.

2. A valve structure as claimed in claim 1 in which said follower rings and reeds are provided with cooperating dowel and dowel receiving openings for registering said reeds in said follower ring grooves.

3. A valve structure as claimed in claim 1 in which said reeds in said valve closing position lie in a plane parallel to the planes of said reed and follower rings.

4. A valve structure as claimed in claim 3 in which said reeds are adapted to be displaced out of said plane parallel to the planes of said reed and follower rings to follow said follower ring grooves in the vicinity of said base portions under air pressure acting to move said reeds to a valve open position, said reeds in said valve open position being clamped against movement out of said plane for an appreciable distance radially inwardly of the periphery of said rings between said follower rings and said webs.

5. A valve structure as claimed in claim 1 in which each of said base portions of each of said reed ring notches has a pair of reed supporting webs.

References Cited in the file of this patent

UNITED STATES PATENTS

| | | |
|---|---|---|
| 1,955,007 | McClay | Apr. 17, 1934 |
| 2,199,307 | Eichelberg | Apr. 30, 1940 |
| 2,408,056 | Farmer | Sept. 24, 1946 |
| 2,433,328 | Beale | Dec. 30, 1947 |
| 2,447,352 | Meitzler | Aug. 17, 1948 |
| 2,452,194 | Huber | Oct. 26, 1948 |
| 2,481,927 | Hooker | Sept. 13, 1949 |
| 2,590,976 | Kalitinsky | Apr. 1, 1952 |
| 2,610,064 | Goddard | Sept. 9, 1952 |